July 18, 1944.  T. McG. AIKEN  2,354,168
CAMERA
Filed May 23, 1942   2 Sheets-Sheet 2
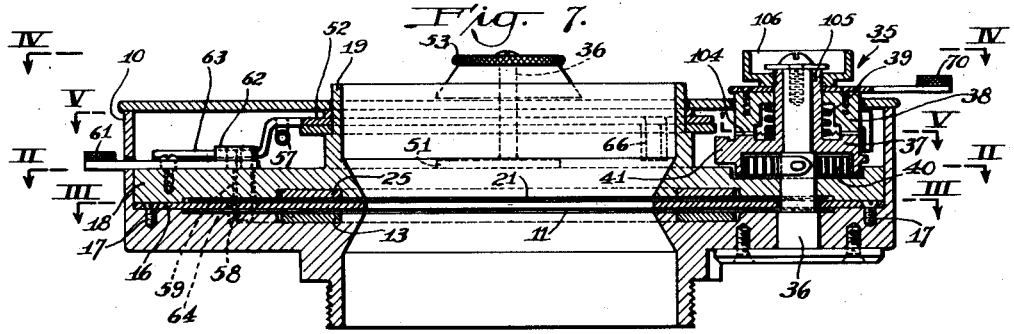
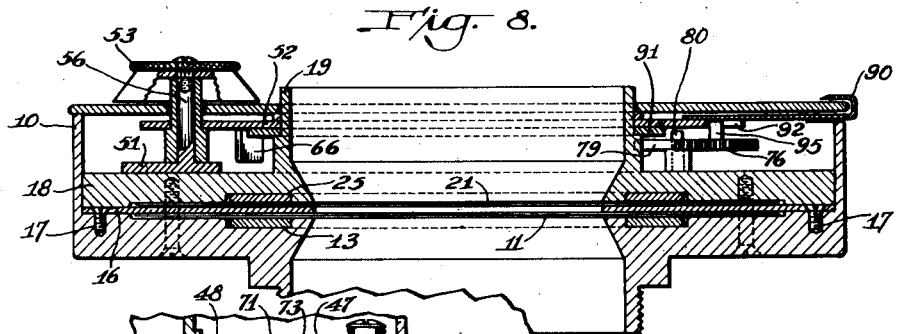
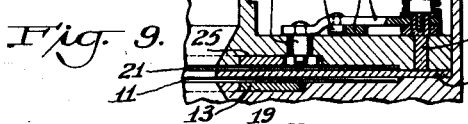
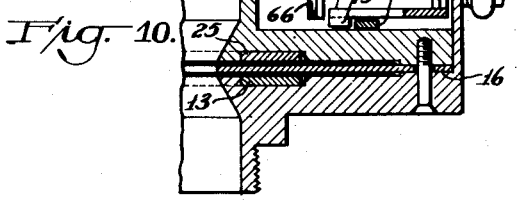
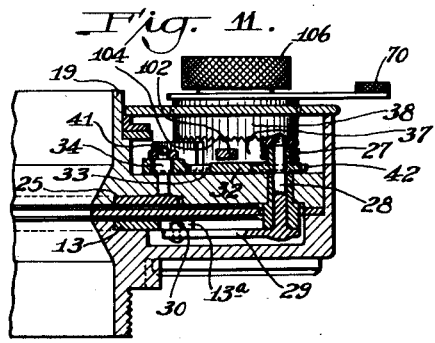
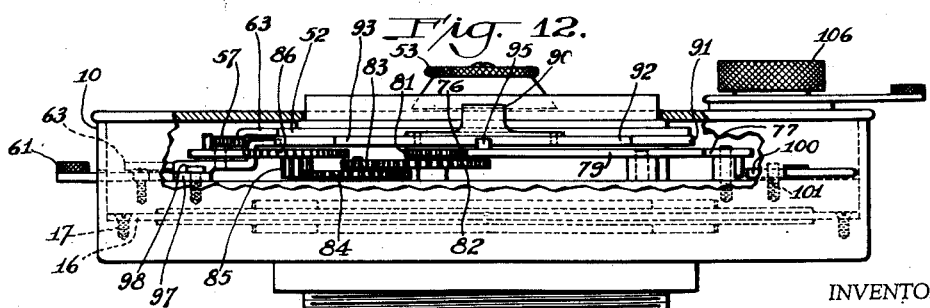
INVENTOR.
Thomas McG. Aiken
BY Archworth Martin
ATTORNEY.

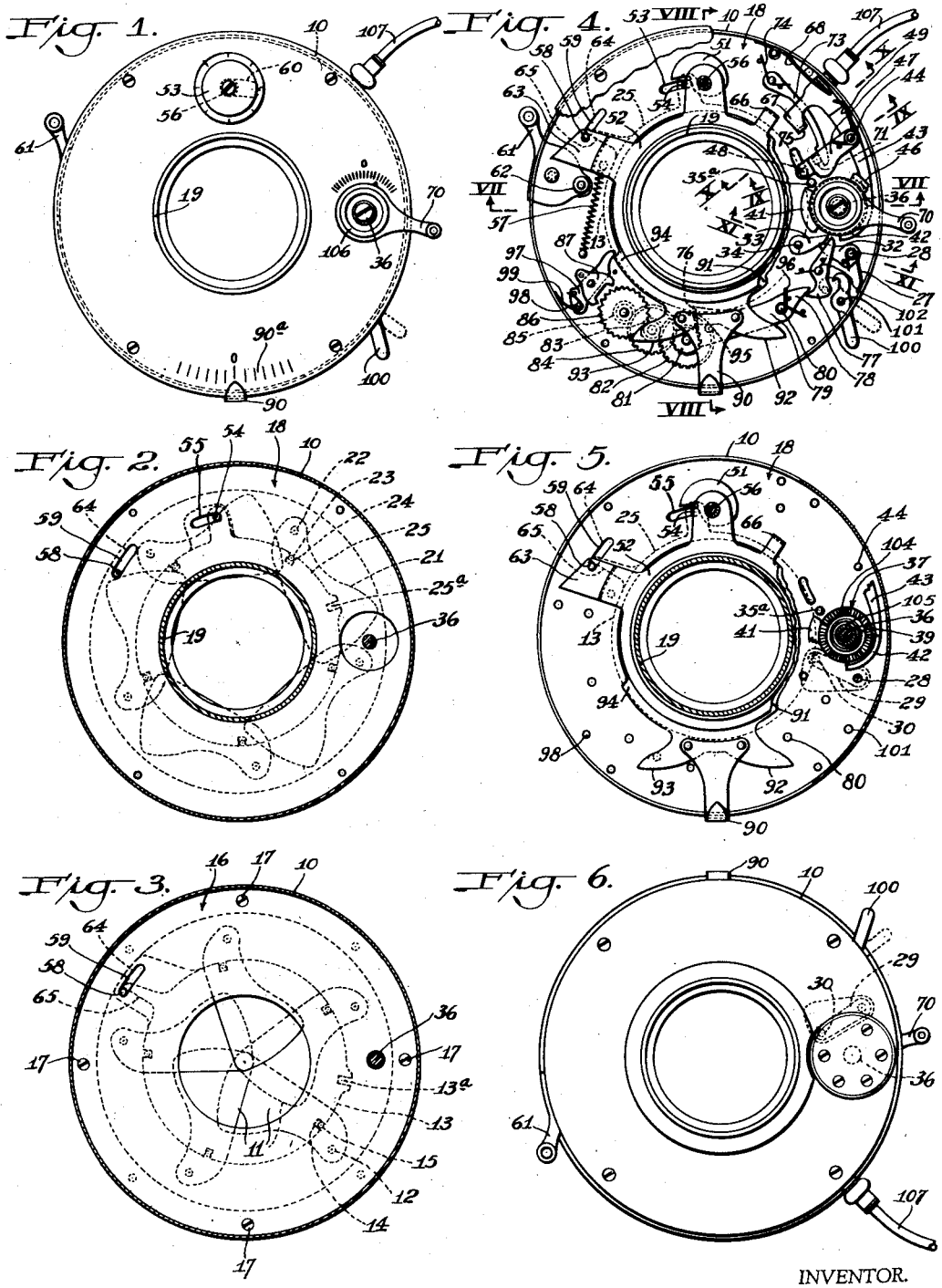

Patented July 18, 1944

2,354,168

UNITED STATES PATENT OFFICE 2,354,168

CAMERA

Thomas McG. Aiken, Pittsburgh, Pa.

Application May 23, 1942, Serial No. 444,185

15 Claims. (Cl. 95—63)

My invention relates to cameras, and more particularly to an improved shutter and diaphragm arrangement, or double shutter arrangement, and constitutes a modification of the apparatus of my application, Serial No. 419,101, filed November 14, 1941 (Patent 2,344,382).

One object of my invention is to provide shutter apparatus and operating mechanism therefor, of such construction that exposures can be made more quickly than has heretofore been possible with cameras of this type.

Another object of my invention is to provide camera apparatus having two sets of blades that are operated in a desired timed relation relative to one another, one set being movable to make an opening for an exposure, and the other set being movable to close off the light.

Another object of my invention is to have all shutter-operating parts move in one direction only during an exposure, to avoid the strain of stopping and reversing the movement of the shutter-operating parts.

Still another object of my invention is to provide shutter-operating mechanism which, while it is operated by a power spring, provides for a more limited duration of actual shutter travel, and therefore a longer duration of full opening during the exposure period, than is possible in those devices where the shutter blades are directly subject to spring tension at the beginning of and throughout their opening movement, in that in the present instance, a power spring is utilized to set in motion and accelerate an impelling element which is under considerable momentum before it reaches a point at which it actually starts movement of a shutter or shutters.

As shown in the accompanying drawings, Figure 1 is a face view of shutter apparatus that embodies my invention; Figs. 2, 3, 4 and 5 are views on a reduced scale, taken on the lines II—II, III—III, IV—IV and V—V, respectively, of Fig. 7; Fig. 6 is a rear view of the shutter apparatus; Figs. 7, 8, 9, 10 and 11 are enlarged views taken on the lines VII—VII, VIII—VIII, IX—IX, X—X and XI—XI, respectively, of Fig. 4, but with the shutter blades and the diaphragm blades only schematically shown, for clarity of illustration, and Fig. 12 is an edge view of the apparatus, with part of its casing broken away.

For the purpose of clarity of illustration and description, certain parts of the apparatus are shown as somewhat out of proportion as to the size they will have in a commercial structure. For example, the barrel for receiving the lens will preferably be of somewhat relatively greater diameter in a commercial structure than shown in the drawings.

The unit comprises the usual casing or barrel 10 that is recessed to receive shutter blades 11 which are pivotally connected by studs 12 to the casing 10. A ring 13 is disposed behind the shutter blades and has slots 14 into which studs 15 on the shutter blades extend, so that upon oscillation of the ring 13 the shutter blades will be opened and closed.

A partition plate 16 is disposed in front of the shutter blades and is held in place by screws 17 (Fig. 7). A plate 18 seats against the outer side of the partition 16 and carries a cylindrical lens-receiving element 19. Diaphragm blades 21 are disposed between the member 18 and the partition plate 16. These diaphragm blades have fixed pivotal connection with studs 22 that are carried by the member 18. The blades 21 carry studs 23 that extend into slots 24 in a ring 25, so that when the ring is oscillated, the blades 21 will be opened and closed.

The shutter blades 11 are normally held closed by a spring 27 (Fig. 4) that is mounted on a shaft 28 and tends to bias said shaft in a clockwise direction. The shaft 28 (Fig. 11) carries a lever or crank arm 29 which, at its outer end, carries a stud 30 that engages a slot 13a in the ring 13, thus yieldably holding the shutter blades 11 closed.

The shafe 28 carries an arm 32 which at its outer end engages a lever 33, the lever 33 being pivotally mounted at 34 on the casing. When the lever 33 is rocked in a clockwise direction, it will move the arms 32 and 29 in a counterclockwise direction, to open the shutter blades. The lever 33 is actuated to open the shutter by a spring-powered unit 35. This unit 35 is mounted on a fixed post 36 and comprises a spring 40, one end of which is secured to the post and the other end of which is connected with an element 37 of the unit 35, the unit being rotatably mounted on the post 36 and its rotative movement limited by a stop 35a. The element 37 has cooperative toothed engagement with another element 38 of the unit 35 (at 104, Fig. 11), a spring 39 being interposed between the elements 37 and 38 to facilitate relative rotative adjustment of the two elements 37—38, as will be hereinafter explained.

The element 37 carries a camming member 41 for the purpose of actuating the lever 33 to open the shutter blades as above explained. The element 37 also carries a flange 42, which serves as a keeper that cooperates with a latch 43 that is pivoted to the casing at 44. When the latch 43 is behind the flange 42, as shown in Fig. 4, the element 35 is held in the position shown in Fig. 4 against the tension or pull of the spring 40. When the latch 43 is tripped clear of the flange 42, the element 35 will be rotated in a counterclockwise direction to actuate the lever 33 and drive the ring 13 in a clockwise direction to open the shutter blades 11 against the resistance of the spring 27. During this rotative movement of the unit 35, a camming member 46 carried by the element 38 of the unit 35 will strike a lever 47 that is pivoted at 44, to effect operation of the diaphragm blades 21, as hereinafter explained.

Movement of the lever 47 in a clockwise direction by the cam 46 carries with it a stud 48 that extends into a slot 25a in the diaphragm-operating ring 25, to thereby effect closing of the diaphragm ring against the tension of its spring 49 that biases the diaphragm blades toward open position. The extent to which the diaphragm blades are held open by the spring 49 is determined by the setting of a cam 51 which is mounted on a shaft 56 that is journaled in a ring 52 that is rotatably supported on the member 19. A slot 60 (Fig. 1) is provided in the cover plate, to permit shifting of the ring 52. The cam 51 is rotatably adjustable by a turn button 53 and has engagement with a stud 54 that extends outwardly through a slot 55 in the member 18. The inner end of the stud 54 is carried by the diaphragm ring 25. The collar 52 is urged in a counterclockwise direction by a spring 57, the tensional force of such spring being greater than the force of the spring 49. The spring 57 normally holds the collar 52 in the position shown in Fig. 4, the movement of the collar in this direction being limited by its stud 58 that extends into a slot 59 that is provided in the plate 18. When the parts are in the position shown in Fig. 4, the diaphragm blades are open to an extent permitted by the setting of the camming disc 51, the blades being wide open when the cam 51 occupies the position of Fig. 4. If the cam 51 be turned in a clockwise direction from the position shown in Fig. 4, it will operate against the stud 54 to push the ring 25 in a counterclockwise direction to shift the diaphragm blades toward closed position in order to provide for adjustments to smaller diaphragm openings.

An operating lever 61 is pivotally mounted in the casing and carries a roller 62 that engages an extension 63 of the collar 52 to rock the collar against the tension of the spring 57, to open the diaphragm blades for focusing. This movement also effects opening of the shutter blades by the stud 58 which extends from the collar 52 through the slots 59 in the member 18 and through a slot 64 in the partition plate 16, and has engagement with an extension 65 on the ring 13. The rocking movement of the lever 61 counterclockwise therefore also opens the shutter blades 11. This operation is performed for the purpose of focusing preparatory to the taking of a picture. The lever 61 is locked against moving the shutter blades to open (focusing) position as above described, by an extension 66 on the collar 52 that is engageable with the tail piece 67 of the latch 43. Thus, if the latch 43 is in the position shown in Fig. 4, at which position the unit 35 is held under tension, the member 66 can be swung past the member 67 to permit operation of the lever 61 to force the shutter blades open against the tension of the shutter spring 27, whereby focusing can be had. At this focusing position, the member 66 is directly opposite to the tail piece 67, so that the latch 43 is held against displacement from its holding position and premature release of the unit 35.

After completion of a focusing operation, the lever 61 is returned to the position shown in Fig. 4, allowing the spring 57 to return the collar 52 to the position shown. At this time, the diaphragm blades are open and the shutter blades closed.

Thereupon, the latch 43 can be tripped against the tension of its spring 68 to release the unit 35 and permit the spring 40 to snap the shutter blades 11 to open position and during such opening movement cause the element 46 to rock the lever 47 to bring the diaphragm blades to their fully closed position. In order to reset the unit 35 under tension, for another exposure operation, the arm 70 of the unit 35 is swung in a clockwise direction until the latch 43 engages behind the flange 42. This operation places the power spring 40 under operation tension and latches the unit.

When the lever 47 is rocked to close the diaphragm blades as above explained, a stud 71 carried thereby will engage a latch 73 that is pivoted to the casing and is biased in a clockwise direction by a spring 74. The stud when it passes behind the shoulder of the latch 73 will hold the diaphragm blades in closed position. The diaphragm blades will thereby be locked shut until the shutter blades have been again closed. With the diaphragm in latch-closed position, the lever 70 of the unit 35 is swung in clockwise direction to close the shutter blades through movement of the cam 41 from the lever 33, thus permitting the spring 27 to close the shutter blades through movement of the arm 29 and the shutter ring 13. During this swinging movement of the lever arm 70, the spring 40 is placed under tension and at the completion of the movement, the latch 43 will snap behind the flange 42. This movement of the latch 43 under the influence of spring 49, causes a bent end 75 on the tail piece 67 to lift the latch 73 from the stud 71, allowing the spring 49 to rock the lever 47 in a counterclockwise direction to effect clockwise movement of the diaphragm ring 25 until its stud 54 engages the cam 51.

The camming disc 51, when set to the position shown in Fig. 4, allows for wide-open diaphragm aperture. If a smaller aperture is desired, the turn button 53, and consequently the disc 51, are turned in a clockwise direction to bring another portion of the camming surface into contact with the stud 54, so that the diaphragm will not be so widely opened under the influence of its spring. Simply varying the adjustment of the diaphragm aperture will not result in any change in the duration of exposure, because at all diaphragm adjustments the closing thereof always will be completed in definite relation to the position at which the unit 35 comes to rest at the end of an exposure operation.

At the completion of an exposure operation, the shutter blades are held against rebound toward closed position, by the cam 41, and the diaphragm blades are held against rebound to open position by the cam 46, which at that time lies against the lever 47.

In order to provide for delayed exposures, upon tripping of the latch 43 and the movement of the unit 35 that carries its flange 41 into engagement with the lever 33 to a point at which the shutter blades are fully opened, the cam 41 will strike a lever 77 (Fig. 4) which will engage the extension 78 of a lever 79 that is pivoted at 80 to the casing. The other end of the lever 79 has rack teeth 76 formed thereon that mesh with a pinion 81 that has connection with a gear wheel 82. The gear wheel 82 meshes with a pinion 83 that has connection with a gear 84. The gear wheel 84 in turn meshes with a pinion 85 that has connection with an escapement wheel 86. An escapement pawl 87 cooperates with the wheel 86 to permit step-by-step rotation of the escapement wheel in the well-known manner, to effect delayed period of exposures, since it will retard or delay movement of the unit 35 and consequently of the flange 46, to effect operation of the diaphragm-closing lever 47. Adjustment of the escapement mechanism is effected by an arm 90 connected to a ring 91. The ring 91 has three camming surfaces 92, 93 and 94. The camming surfaces 92 and 93 cooperate with a stud 95 on the rack segment arm 79, the arm 79 being normally biased in a clockwise direction by a spring 96.

When the arm 90 is swung in a direction to move the camming surface 92 along the stud 95, the camming surface 94 will move an arm 97 which carries the pawl 87 and is pivoted at 98 to the casing, and is biased in a clockwise direction by a spring 99, thus moving the escapement 87 away from 86 and rendering it ineffective to control movement of the retarding gears. The shutter movement will therefore be delayed only by the inertia of the gear train 81—86. The adjustment of the arm 90 in the manner named not only disengages the escapement pawl, but rocks the rack arm 79 in a counterclockwise direction through engagement of the cam surface 92 with the stud 95 of the lever, so that the segmental teeth of the lever 79 will have passed to a greater or less extent over the pinion teeth 81, and the lever 77 pushed farther in a clockwise direction by the cam 41, before its movement is retarded by the arm 79. The retarding period of the gear train is therefore shorter, and quicker operation of shutter is secured.

When it is desired to have slower operation of the shutter, the arm 90 is swung in a counterclockwise direction to move the cam surface 94 away from the pivoted arm 97, thus permitting the spring 99 to swing the escapement pawl 87 into operative engagement with the wheel 86. If the counterclockwise adjustment of the arm 90 is stopped at a point just past the zero or mid position of the scale 90a, a maximum duration of timing will be had, since the gear segment of 79 will have full length travel on the pinion 81 and the escapement will allow only step-by-step movement of the retarding gears. If slightly faster movement is required while the escapement is still operative, the arm 90 will be swung still farther in a counterclockwise direction, to shift the stud 95 and the gear segment farther outward to limit the duration of its travel, as above explained.

For the purpose of making time exposures, or for focusing with the diaphragm reduced down to a smaller opening, a latch 100 which is pivoted at 101 to the casing is provided. This latch is engageable with a stud that is carried on the lever 77. If the latch 100 be in hooked engagement with the lever 77, upon tripping of the latch 43 movement of the unit 35 will be arrested through engagement of the cam 41 with the lever 77. After the desired period of exposure, the latch 100 will be manually tripped to permit continued counterclockwise movement of the unit 35 and further advancing movement of the flange 46 against the lever 47, to close the diaphragm blades, thus completing the exposure. A spring 102 biases the latch 77 counterclockwise.

For the purpose of focusing with the diaphragm at a restricted opening, the latch 100 will be engaged with the stud on the lever 77 and the latch 43 moved to release position, allowing the shutter blades to be opened for focusing, by the spring 40. After focusing, the lever 70 is reset in engagement with the latch 43, and the latch 100 will be manually disengaged, allowing the release of the shutter to cause the complete exposure in accordance with the adjustments.

In order to change the distance of the cam 46 from the diaphragm-actuating lever when the shutter operating unit 35 is held under tension by the latch 43, ready for an exposure operation, and hence to vary the time at which the diaphragm will be started toward its closed position while the unit 35 is traveling in shutter-opening direction, I provide for relative rotative adjustment of the members 37 and 38. As stated above, these members have cooperating teeth, as indicated at 104 (Figs. 7 and 11). The member 37 has a bushing portion 105 that carries a nut 106 which holds the teeth of element 38 in close fit with the teeth of the element 37, so that these elements will be held against relative turning when the nut is screwed down. Upon loosening of the nut 106, the element 38 will be pushed up by the spring 39 so that the element and its cam 46 can be turned to move this cam closer to or farther away from the lever 47, without changing the position of the element 37 and its cam 41 relative to the shutter-operating lever 33.

If this adjustment is made in a clockwise direction, to move the cam 46 farther from the lever 47, the shutter blades 11 will be at their wide-open position for a longer time before the diaphragm blades are started toward closed position by impact of the cam 46 against the lever 47, thus giving a longer exposure than at the setting shown in Fig. 4. For shorter exposures, the adjustment is made counterclockwise, and the cam 46 can be set so close to the lever 47 that closing movement of the diaphragm blades 21 can be started even before the unit 35 has rotated far enough to start opening movement of the shutter blades 11. It will thus be seen that exposures of extremely short duration can be had, and much shorter than can be had with cameras wherein a single set of shutter blades have to be moved through a complete opening and closing cycle when making an exposure.

From the foregoing, it will be seen that upon tripping of the latch 43 as by operation of a cable release element at 107, the unit 35 will be snapped by the spring 40 in a counterclockwise direction, but that shutter-opening movement will not begin until the member 35 has rotated far enough for the cam 41 to hit the lever 33, at which time it will have sufficient momentum to exert a sharp shutter-opening impact on the lever 33, thus providing for quicker travel of the shutter blades 11 to their open position than where opening movement of the shutter is started simultaneously with expansion of a power spring. Similarly, the impact of the cam 46 on the diaphragm-operating lever 47 is sharp and will result in equally rapid closing of the shutter blades 21. The duration of exposure will, of course, depend upon the time at which opening movement of the shutter blades begins relative to the time at which closing movement of the diaphragm blades begins. For instance, the diaphragm blades can still be wide open until the time the shutter blades reach their open position, or the diaphragm blades can be nearly closed before the shutter blades are started in their opening movement, depending upon the adjustment of the element 38 and its cam 46 as above explained.

By so adjusting the unit 35 that the lever 70 is set further in a clockwise direction than shown in Fig. 1, thus bringing the cam 46 closer to the cam 41 and thereby providing for a longer period of delay between opening of the shutter 11 and the striking of the cam 46 against the lever 49 to close the shutter 21, the retarding gears can have a longer operating period, and the larger part of the range of movement of the unit can, therefore, be utilized to drive the timing gears, to thereby permit of longer exposures. The unit during this timing period can thus be free of the shutter blades.

While I have herein referred to diaphragm blades and shutter blades, I have in effect two sets of shutter blades designated by the numerals 11 and 21 respectively, the terms "shutter" and "diaphragm" being employed for convenience of description, and also because the blades 21 are employed as a diaphragm.

From the foregoing it will be seen that I not only provide for extremely rapid movements of the shutters, but reduce the strains on the mechanism below what would ordinarily be expected with high speed shutters. For example, the shutter-operating rings 13 and 25 operate in one direction to open and close their respective shutters for an exposure, thus avoiding strains that would be incurred by sudden stopping and reversal of shutter movement. Also, while the cam 41 of the power unit by its thrust against the lever 33 starts opening movement of the shutter ring 13 at very high speed, there is a tapering off of the speed at which the unit moves the shutter, because as the cam 41 reaches the extremity of the lever 33, the cam will be at a farther distance from the shaft 34 of the lever and the shutter ring will therefore be moved at a slower rate relative to that at which the unit is moving, instead of progressively increasing such speed clear to the wide-open position of the shutter blades.

Another advantage present in the apparatus is that, when the unit is so adjusted that its cam 41 has completed the opening movement of the blades 11, with the cam 46 not yet in engagement with the closing lever 49 of the blades 21, the retarding gears can be made effective to retard or delay the movement of the unit 35 for the desired period of time, free of connection with the blades 21. The time control can thus be made more accurate than if it became effective only after the blades 21 had been started toward their closed position. This arrangement has the further advantage that the actual speeds of the travel by the shutters in opening and closing may always be at the same rate, regardless of the timing mechanism.

The shutter is particularly useful in aerial cameras, since although it can be operated to give very short exposures, a full exposure opening can be had for a greater portion of the total exposure period, since the actual time required for shutter movements to open and closed positions respectively is extremely short, and the duration of full opening after the shutter 11 is wide open and before the shutter 21 is started toward its closed position, can be varied. When used in aerial photography, the diaphragm adjusting disc 51 will ordinarily be set to allow a desired width of opening of the blades 21. Also, the timing gears can be omitted or set at a neutral position. This will permit high speed photography at the desired shutter opening. In connection with the matter of the timing gears, the lever 100 can be utilized to render them ineffective to retard the power unit and also to prevent the slight resistance by the lever 77 and its spring 102, to movement of the shutter-operating lever 33. In this latter instance, the lever 77 will be swung in a clockwise direction by movement of the cam 41, or otherwise, whereupon the lever 100 will be moved to its dotted line position, so that its nose will lie against the outer side of the stud that is carried by the lever 77, thus holding the upper end of the lever 77 out of the path of movement of the cam 41.

I claim as my invention:

1. Apparatus for use in conjunction with an exposure aperture of a camera, comprising a shutter for the aperture, a spring normally holding the shutter closed, an actuating lever for moving the shutter against the spring tension, a power spring of greater strength than the first-named spring, an operating unit for the actuating lever, having lost-motion engagement therewith and having operative connection with the power spring, means for latching the unit to hold the power spring under tension and the unit in spaced relation to the actuating lever, whereby upon release of the latch the said unit will acquire momentum before it operates the shutter-actuating lever, and a second shutter for the aperture having a closing device which is operated by the last-named movement of the said unit.

2. Apparatus for use in conjunction with an exposure aperture of a camera, comprising a shutter for the aperture, a spring normally holding the shutter closed, an actuating lever for moving the shutter against the spring tension, a power spring of greater strength than the first-named spring, an operating unit for the actuating lever, having lost-motion engagement therewith and having operative connection with the power spring, means for latching the unit to hold the power spring under tension and the unit in spaced relation to the actuating lever, whereby upon release of the latch the said unit will acquire momentum before it operates the shutter-actuating lever, a second shutter for the aperture having a closing device which is operated by the said unit, and means for adjusting the unit so that it will have a desired length of travel before it operates the said closing device.

3. Apparatus for use in conjunction with an exposure aperture of a camera, comprising a shutter for the aperture, a spring normally holding the shutter closed, an actuating lever for moving the shutter against the spring tension, a power spring of greater strength than the first-named spring, an operating unit for the actuating lever, having lost-motion engagement therewith and having operative connection with the power spring, means for latching the unit to hold the power spring under tension and the unit in spaced relation to the actuating lever, whereby upon release of the latch, the said unit will acquire momentum before it operates the shutter-actuating lever, a second shutter for the aperture having a closing device which is operated in timed relation to said unit, and adjustable timing means for varying the rate at which the shutter-closing device will be moved by the operating unit.

4. Apparatus for use in conjunction with an exposure aperture of a camera, comprising a shutter for the aperture with means for normally holding it closed, a second shutter for the aperture provided with means for normally holding it open, an operating unit having operating engagement with each of the shutters, whereby during movement of the unit in a direction to effect an exposure, the first-named shutter is opened and the second-named shutter closed, means for holding the first-named shutter in its open position during movement of the second-named shutter to its completely closed position, and a latch for holding the second-named shutter in its closed position until resetting of the first named shutter in closed position preparatory to another exposure operation.

5. Apparatus for use in conjunction with a camera having an exposure aperture, comprising a shutter for the aperture having a spring that normally holds it closed, a second shutter for the aperture having a spring that normally holds it open, an operating unit mounted for oscillating movement, means for tensioning said unit for movement thereof in a given direction, and means operable during movement of the unit in said direction to open the first-named shutter and close the second-named shutter against their respective tensions, the last-named means releasing the shutters for movements by their respective springs to their original positions upon the return of the unit to its tensioned position.

6. Apparatus for use in conjunction with an exposure aperture of a camera, comprising a shutter for the aperture, a spring normally holding the shutter closed, a second shutter for the aperture, having a spring for normally holding it open, a power spring of greater strength than the first-named springs, an operating unit movable in one direction in opposition to the power spring and thereby placed under operating tension, a latch for holding the said unit under operating tension, and operating connections between the said unit and the shutters, arranged to move the shutters against their respective spring tensions when the unit is released from its latch and is being moved in the opposite direction by the power spring, the said operating connections being arranged to release the first-named shutter for closing movement by its spring and then release the second-named shutter for movement to open position by its spring, when the operating unit is again moved to be placed under operating tension.

7. Apparatus for use in conjunction with an exposure aperture of a camera, comprising a shutter therefor of the iris type that is normally in closed position, a second shutter therefor of the iris type normally in open position, a power spring, means for tensioning the spring, an operating unit having operative connection with the power spring and actuated thereby in one direction, elements respectively engageable by the unit during actuation thereof by said spring, for opening the first-named shutter and closing the second-named shutter, there being clearance between said unit and the elements, whereby during movement of the unit by the power spring it acquires momentum and the first-named shutter is then opened and the second-named shutter closed, in predetermined timed relation to effect an exposure, and means for returning the first-named shutter to its closed position and thereafter the second-named shutter to its open position, when the operating unit is moved in the opposite direction.

8. Apparatus for use in conjunction with an exposure aperture of a camera, comprising a shutter therefor of the iris type that is normally in closed position, a second shutter therefor of the iris type normally in open position, a power spring, means for tensioning the spring, an operating unit having operative connection with the power spring and actuated thereby in one direction, elements respectively engageable by the unit during actuation thereof by said spring, for opening the first-named shutter and closing the second-named shutter, there being clearance between said unit and the elements, whereby during movement of the unit by the power spring it acquires momentum and the first-named shutter is then opened and the second-named shutter closed, in predetermined time relation to effect an exposure, the points of operating engagement between the unit and the respective elements being adjustable relative to each other, whereby the movement of one shutter will be started at a desired instant relative to starting of movement by the other shutter and the exposure period thus controlled, and means for returning the first-named shutter to its closed position and thereafter the second-named shutter to its open position, when the operating unit is moved in the opposite direction.

9. Apparatus for use in conjunction with an exposure aperture of a camera, comprising a shutter therefor of the iris type that is normally in closed position, a second shutter therefor of the iris type normally in open position, a power spring, means for tensioning the spring, an operating unit mounted for oscillation and having operative connection with the power spring and actuated thereby in one direction, the unit having operating engagement with each of the shutters, whereby during movement of the unit by the power spring the first-named shutter is opened and the second-named shutter is closed, to effect an exposure, the points of said operating engagement being adjustable relative to each other, whereby the movement of each shutter will be started at a desired instant relative to starting of movement by the other shutter and the exposure period thus controlled, and means for returning the first-named shutter to its closed position and the second-named shutter to its open position, when the operating unit is moved in the opposite direction.

10. Apparatus for use in conjunction with an exposure aperture of a camera, comprising a shutter therefor of the iris type, an oscillating ring for opening and closing the shutter, but normally holding it in open position, a second shutter therefor of the iris type, an oscillating ring for opening and closing this second shutter but normally holding it in closed position, an oscillatory unit for actuating said rings to move the shutters to their opposite positions, ring-actuating members on said unit for operating the said rings in predetermined sequence during a rotative movement of the unit, a power spring for rotating the unit in a shutter-operating direction, means for rendering the connections between the unit and the shutter rings effective only after the unit has acquired momentum through movement thereof by the power spring, and means for returning the first-named ring and then the second-named ring to their normal positions, when the operating unit is moved in the opposite direction.

11. Apparatus for use in conjunction with an exposure aperture of a camera, comprising a shutter for the aperture, which is normally closed, and a shutter for the aperture, which is normally open, a lever for operating each of the shutters, a rotatably-mounted operating unit, cams on said unit for engaging said levers to effect movement of the shutters to their opposite positions, during movement of the unit in one direction, the said cams being relatively adjustable in directions circumferentially of the unit, to operate said levers in desired sequence, and means for returning the first-named shutter to its closed position and thereafter the second-named shutter to its open position, when the operating unit is moved in the opposite direction.

12. Apparatus for use in conjunction with an exposure aperture of a camera, comprising a shutter for the aperture, which is normally closed, and a shutter for the aperture, which is normally open, an operating unit for operating the shutters, an element on the unit engageable with the first-named shutter, to open the same during an early stage of movement by the unit in one direction, a second element engageable with the second-named shutter, for closing the same at a later stage in the said movement of the unit, means for adjusting the said elements relative to one another, whereby the said closing will be started at an adjusted interval in relation to the said opening movement, and means for returning the first-named shutter to its closed position and thereafter the second-named shutter to its open position, when the operating unit is moved in the opposite direction.

13. Apparatus for use in conjunction with an exposure aperture of a camera, comprising a shutter for the aperture, which is normally spring-held in closed position, a shutter for the aperture, which is normally spring-held in open position, means for holding the second-named shutter at a desired stop position in opposition to its spring means, a manually-operable element movable from a given position to open the first-named shutter and to move the said stop means to a retracted position, to thereby permit the second-named shutter to be moved by its spring to wide open position, to thus uncover the aperture, and means operable when said element is at said given position, to open the first-named shutter and close the second-named shutter.

14. Apparatus for use in conjunction with an exposure aperture of a camera, comprising a shutter for the aperture, which is normally spring-held in a closed position, a shutter for the aperture, which is normally spring-held in an open position, means for holding the second-named shutter at a desired stop position in opposition to its spring tension, a manually operable element movable from a given position to open the first-named shutter and to move the said stop means to a retracted position, to thereby permit the second-named shutter to be moved by its spring to wide open position, to thus uncover the aperture, a spring-actuated shutter-operating unit for moving the shutters from their said normal positions to their opposite positions, when the said element is at its said given position, means for releasably latching the said unit under operating tension, and a safety stop device for preventing movement of said element from said given position when the said unit is in its unlatched and spent position.

15. Apparatus for use in conjunction with an exposure aperture of a camera, comprising a shutter for the aperture, which is normally spring-held in a closed position, a shutter for the aperture, which is normally spring-held in an open position, means for holding the second-named shutter at a desired stop position in opposition to its spring tension, a manually operable element movable from a given position to open the first-named shutter and to move the said stop means to a retracted position, to thereby permit the second-named shutter to be moved by its spring to wide open position, to thus uncover the aperture, a spring-actuated shutter-operating unit for moving the shutters from their said normal positions to their opposite positions, when said element is at its given position, means for releasably latching the said unit under operating tension, and a safety stop device for preventing release of said unit from its latched position when the said element occupies the position at which the shutters are open.

THOMAS McG. AIKEN.